United States Patent [19]

Stüble et al.

[11] Patent Number: 4,904,282

[45] Date of Patent: Feb. 27, 1990

[54] FILTER APPARATUS AND METHOD OF OPERATING SAME

[75] Inventors: Helmut Stüble, Stuttgart; Heinz Burkhardt, Tamm; Josef Velinsky, Kornwestheim, all of Fed. Rep. of Germany

[73] Assignee: LTG Lufttechnische GmbH, Stuttgart, Fed. Rep. of Germany

[21] Appl. No.: 207,260

[22] Filed: Jun. 15, 1988

[30] Foreign Application Priority Data

Sep. 13, 1987 [DE] Fed. Rep. of Germany ....... 3730788

[51] Int. Cl.$^4$ .............................................. B01D 46/04
[52] U.S. Cl. .......................................... 55/96; 55/213; 55/273; 55/294
[58] Field of Search ............ 55/96, 213, 273, 283–285, 55/294–297

[56] References Cited

U.S. PATENT DOCUMENTS

| | | | |
|---|---|---|---|
| 3,332,215 | 7/1967 | Revell | 55/96 |
| 3,423,905 | 1/1969 | Chambers | 55/294 |
| 3,555,785 | 1/1971 | Wooldridge et al. | 55/96 |
| 3,606,735 | 9/1971 | Baigas | 55/273 |
| 4,222,754 | 9/1980 | Horvat | 55/283 |
| 4,509,961 | 4/1985 | Jones | 55/294 |
| 4,784,675 | 11/1988 | Leber et al. | 55/243 |

Primary Examiner—Charles Hart
Attorney, Agent, or Firm—Herbert Dubno; Ronald Lianides

[57] ABSTRACT

An apparatus for filtering air containing textile impurities, comprises an air-permeable, fixed collecting device preferably of accordion shape, for separating the textile impurities. The collecting device has a number of filtering portions which can be cleaned by at least one suction device.

20 Claims, 4 Drawing Sheets

FILTER APPARATUS AND METHOD OF OPERATING SAME

FIELD OF THE INVENTION

Our present invention relates to a filter device and to a method of operating same.

BACKGROUND OF THE INVENTION

A filter device for removing fiber fragments from air is described in German Patent 14 04 894. Each portion of the collecting device is formed by two vertical filters disposed so as to form a V. Each V portion is associated with a corresponding V-shaped blow-pipe system which is moved up and down for pneumatically cleaning the associated V-portion of the collecting device.

Each V-portion of the collecting device can be closed by a lamellar shutter at the inlet to the interior of the V-portion to prevent exhaust air from flowing in for purification.

In order to clean a selected V-portion, the shutter is closed and the blow-pipe system associated with the V-portion can then be moved up and down so as to blow off the impurities which have accumulated on the V-portion, so that they fall onto the base of the V-portion and can e.g. be pneumatically sucked therefrom. This filter system is complicated in construction, uses a relatively large amount of energy for pneumatic cleaning, and is completely unusable for filtering air during the cleaning of a V-portion.

OBJECT OF THE INVENTION

An object of the invention is to provide an improved apparatus which is of simple construct and comprises a collecting device which can easily and quickly be cleaned pneumatically during operation of the filtering device without switching off the portions which are being cleaned.

SUMMARY OF THE INVENTION

This object and others which will become apparent hereinafter are attained with a filter apparatus for filtering air containing textile impurities such as fibers, fiber knobs, other fiber fragments, including textile residues or the like, more particularly air removed from at least one textile machine and/or at least one textile-machine room. The filter apparatus comprises a fixed collecting device permeable to air and through which the air flows for filtering, the collecting device being used to separate textile impurities and comprising a number of active filter portions which can be separately cleaned by a pneumatic cleaning device.

According to the invention the pneumatic cleaning device has at least one suction means or device drivable in reciprocation and used for cleaning at least one filter portion of the collecting device by sucking impurities which have accumulated thereon. The suction device is movable along a straight path for cleaning the filter portion, and being designed and disposed so that it extends along the portion in a direction transversely to its direction of motion, so that the portion can be cleaned by the suction device in a single movement in a straight line.

The filter apparatus according to the invention saves energy and can clean the collecting device without switching off the portions being cleaned, so that even during cleaning practically the entire filter surface of the collecting device is available for filtering air.

On the other hand the invention enables each individual filter portion to be cleaned particularly quickly, and thus the complete collecting device is also cleaned quickly. This derives from the suction means extending over each portion which has to be cleaned and from the need to make only a single linear motion in only one direction in order to clean the portion.

The portions can advantageously be large and are preferably approximately rectangular with preferably a relatively large width and length, or can be square or differently-shaped if required, e.g. arcuate. Optionally also, the suction means can be moved more than once over the respective portion during each cleaning thereof, but this is not usually necessary.

The filter device according to the invention needs little power and consumes little energy for pneumatic cleaning. Usually it is quite sufficient if only one portion is cleaned at a time, during which the other portions are not cleaned.

In many cases it may be quite sufficient if the total suction time during which the pneumatic cleaning device is in operation is only a part, if required only a small part, of the total operating time of the filter device.

According to a particularly advantageous feature, the collecting device is cleaned on each occasion in only one cycle, during which the portions of the collecting device are cleaned one after the other in succession in a predetermined sequence. After this cycle no cleaning occurs for a relatively long period, i.e. there is an interval, relatively long if required, between each two cleaning cycles, during which no cleaning is carried out.

For this purpose a timing device or the like can be provided and is used for time-programming. Alternatively, the pressure difference between the upstream air to be filtered and the air downstream behind the collecting device can be sensed. When the pressure difference reaches a predetermined value, a cleaning cycle is automatically switched on and, at the end of the cleaning cycle, there is a wait until the pressure difference, as a result of accumulation of textile and other impurities on the collecting device, has returned to the preset value. Thereupon another automatic cleaning cycle cleaning is automatically switched on.

According to a particularly advantageous feature, only a single portion is cleaned at one time, during which the other portions are not cleaned, since the volume of suction air used for cleaning can then be reduced to a minimum. If a very large accumulation of impurities has to be allowed for, two or more portions can be cleaned simultaneously.

It is particularly advantageous if a collecting device is cleaned in accordance with a predetermined cycle during which the portions of the collecting device are successively cleaned in a predetermined sequence; preferably the portions are not cleaned successively in the sequence in which they are disposed, but the cleaning sequence is differently programmed, so that the air for filtering is more uniformly distributed over the collecting device during purification.

Preferably, each portion is associated with a separate suction device, so that each suction device of the cleaning device has to be moved only in linear manner in reciprocation along a single straight track, preferably only in vertical strokes. This greatly simplifies the construction of the guide and drive means for the pneumatic cleaning device; preferably all the suction means can be disposed on a common carrier, bearer or supporting beam movable only in a straight line, which is particularly simple with regard to the construction and drive.

According to another feature of the invention, in which likewise each portion of the collecting device to be cleaned is associated with a separate suction means for cleaning it only, the suction means are disposed individually or in groups on separate bearers movable in linear reciprocation independently of one another. Thereby only one carrier at a time has to be moved and bears a suction means for cleaning the portion of the collecting device associated with it at that moment. This enables the drive power to be reduced, increases the versatility of the cleaning device and enables it to be made up of smaller, substantially identical modular units in variable quantities as required, forming a modular system.

Alternatively the number of suction devices can be smaller than the number of portions of the collecting device to be cleaned. Advantageously the device can comprise at least one and preferably only one suction device or at least one group of suction devices movable in common, preferably a single such group, the suction devices or group being movable in three dimensions in order to be moved towards various portions of the collecting device for cleaning them.

Each portion of the filter device cleanable by a suction means can be made up of one or more filters or one or more active regions of a filter, which can comprise an air-impermeable frame on which the filter substrate is secured, e.g. by clamping. Alternatively each portion of the collecting device to be cleaned by the suction means can be a portion of a filter comprising a number of or all the portions to be cleaned. Other possibilities are also conceivable.

Generally the collecting device may advantageously comprise a number of filters, preferably individually exchangeable. In many cases, however, the collecting device can comprise only a single filter. The collecting device can also be described as a filter system, at least when it comprises a number of filters.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

FIGS. 1-4 show a filter device 10 for separating textile impurities, such as fibers, fiber fragments, textile residues and fiber knobs, from air sucked from textiles machines such as spinning, weaving, knitting or other textile machines, or alternatively air from textile-machine rooms, preferably from an air-conditioning plant for the textile-machine rooms in question.

If required, the filter device 10 can also separate other impurities, such as dust, from the air flowing through it for cleaning.

The filter device 10 can preferably have a large volume, since usually the amounts of air sucked from textile machines or machine-rooms is large. For example, it can be large enough for a maintenance operator to enter the interior of the outer casing 11 through a door (not shown) and carry out maintenance work or the like when standing up, while the filter device 10 is inoperative.

The outer casing 11, which is substantially cuboid, has an inlet nozzle 12 and an outlet nozzle 13 for the air flowing through it for filtering, and can also contain a collecting device 14, which can also be called a filter system or total filter. The filter device 14 comprises a relatively large number of filters 15 of equal size.

Individual filters or filter portions 15 in device 14 are flat and rectangular and each constitute a rectangular filter portion of the collecting device and can be independently cleaned by an associated suction device 18. Each filter 15 is associated with a separate suction device 18. Air for purification flows through filters 15 and the textile impurities and any other impurities such as dust therein are deposited on the filters 15 depending on their construction, i.e. are filtered from the air.

Each filter 15 is secured to the frame of the collecting device 14 and can e.g. be a metal or textile cloth or screen or other air-permeable filter substrate, having a dirty side on which impurities such as fibers can collect after being separated from the air for filtering.

The flat filters 15 make up a collecting device 14 which has an accordion shape in plan view and in horizontal section. Each pair of adjacent filters 15 form a V in cross-section. The advantage of this is that air for purification can flow in a particularly uniform manner across the width and height of filters 15 and consequently the impurities deposited from the air can be distributed on them in substantially uniform manner. This is because the recesses (dirty recesses) 16 formed by the dirty sides of each V formed by a pair of filters 15, and also the recesses (clean recesses) 16' formed by the adjacent V of clean sides of filters 15, are disposed so that the "dirty recesses" 16 taper in the downstream direction of the air, corresponding to the reduction in the flow of air, and the "clean recesses" 16 correspondingly increase in size downstream to match the increase in the flow of air through them.

Each filter 15 constitutes a separately pneumatically cleanable portion of the collecting device 14 and in the present embodiment has a width considerably less than its vertical length or height. If required, however, it can also be square or wider than its vertical length or height. At the bottom, each filter 15 is mounted in airtight manner on the base 47 of housing 11 and extends up to a horizontal plate 48 on which its top side is disposed in airtight manner. The joints between the filters 15 are also connected in airtight manner by means not shown, e.g. by frame portions.

Filters 15 are individually exchangeable, so that if damaged they can without difficulty be replaced by new filters, or if it is necessary to change the pore size, mesh width etc. of the filter substrate. Plate 48 constitutes the base of a U-section member 49 disposed under the roof 50 of the outer casing 11 and extending from one longitudinal side wall 17 of casing 11 to the other longitudinal side wall 17' and containing a programming device 39 in its interior.

The collecting device 14, which is fixed and therefore immovable in casing 11, extends nearly from one longitudinal side wall 17 to the other wall 17'. The distances between it and the inlet nozzle 12 and outlet nozzle 13 are such that the air to be purified can be distributed approximately uniformly over the collecting device 14 and can thus flow substantially uniformly through it.

The air to be purified can be blown or sucked through the filter device 10 by air conveying means such as at least one fan, bellows or the like (not shown).

The collecting device 14 is associated with an automatic pneumatic cleaning device 19 for automatically cleaning the filters 15. The device comprises a straight horizontal pipe, having a rectangular cross-section, closed in airtight manner at both ends and constituting a bearer or supporting beam 20 for suction that noses 21 disposed side by side on it.

Beam 20 can move only vertically and its two longitudinal ends are each vertically guided in a straight line in a respective vertical guide 22. Guides 22 have a U cross-section and are fixed to the two longitudinal side walls 17, 17' of the cuter casing 11.

Figure 1:
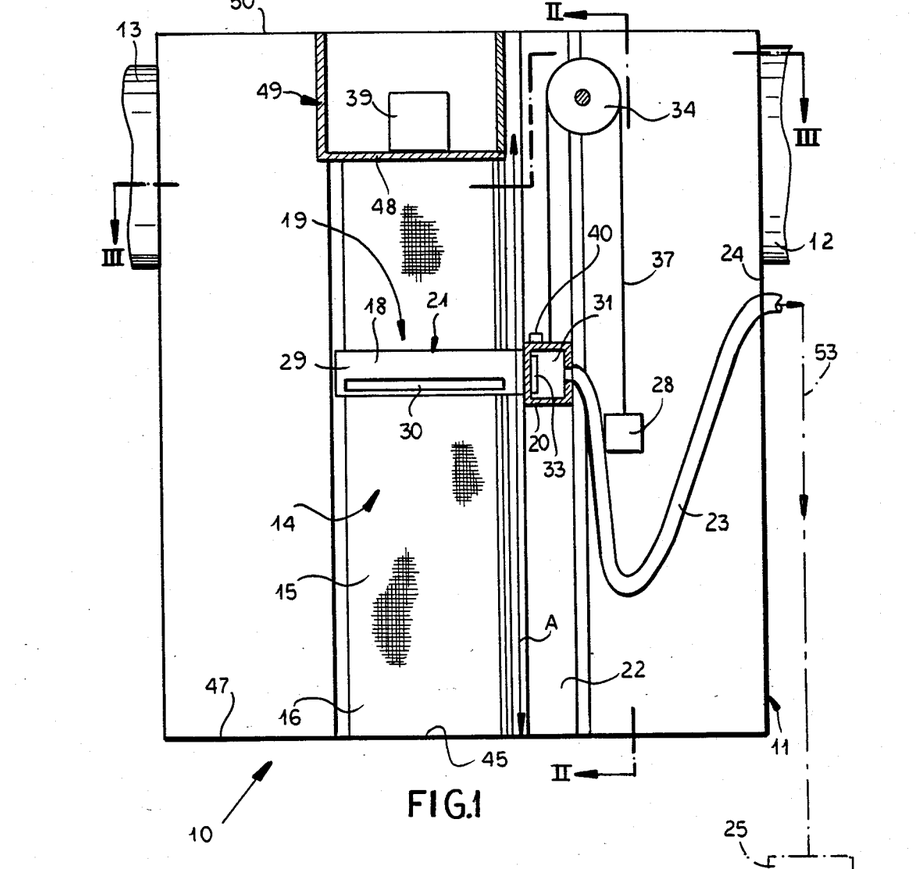
FIG. 1 is a cross-section through a filter device according to a first embodiment of the invention.

A flexible tube 23 is connected to the interior 31 of the hollow beam 20 and extends through an opening in the vertical front wall 24 of casing 11 to the exterior of the filter device 10 and, as shown diagrammatically by a chain-dotted line in FIG. 1, is connected by a line 53 to a separator 25 followed by a negative-pressure source 26.

The air flow rate through separator 25 is much smaller than through the filter device 10, so that separator 25 can be correspondingly smaller than filter device 10. Separator 25 is used only for removing textile and other impurities from the suction air, the impurities being highly concentrated in the air flow and sucked from the dirty sides of filters 15 by the suction noses 21 for cleaning them. Separator 25 can e.g. be designed so it automatically compresses the filtered material, e.g. fibers, separated in it and conveys it in one or more sacks or collecting containers for further transport. Separators of this kind are known and need no further explanation.

The suction noses 21 are disposed side by side on the vertical longitudinal side of beam 20 facing the collecting device 24 and are constructed so that they project into the dirty recesses 16 and their vertical longitudinal side walls 29, 29' extend at a short distance above the filters 15 across their widths almost as far as the downstream ends of recesses 16. Noses 21 are identical with one another. Each nose 21 is hollow and its interior is divided by a vertical longitudinal central partition 51 into two separate chambers 27, 27'. Each partition 29, 29' therefore extends across the width of the facing filter 15.

Near the bottom end region of each vertical longitudinal partition 25, 25' of each nose 21, a suction nozzle is disposed and extends almost over the length of partition 29 or 19' and projects slightly over it, and has a suction opening 30, preferably in the form of a narrow continuous rectangular slot, which is disposed at a small distance of preferably about 0.5 to 2.5 cm away from the dirty side of the adjacent filter 15 in order to clean it. Accordingly, each nose 41 forms two suction devices 18 combined into a structural unit and separated in airtight manner from one another by the partition wall 51, each means being used for suction and cleaning the adjacent filter 15.

Each horizontal suction opening 30 extends over or almost over the horizontal width of the air-filtering surface of filter 15, so that opening 30 can suck all the impurities which collect across the width of the dirty side of filter 15 during operation of the filter device, without the opening having to be horizontally moved.

The vertical internal height of each suction opening 30 is small, e.g.—0.5 to 2.5 cm, whereas its length corresponds to the width of the filter surface of the associated filter 15 and is much larger, e.g. 20–100 cm or smaller or larger if required, so that opening 30, in order completely to clean the associated filter 15, only has to be moved once n a straight vertical line along filter 15, i.e. vertically along the filter surface.

The vertical height or length of filter 15 is considerable, e.g. can be 1 to 3 m, depending on the capacity of the filter device, but can also be smaller or larger.

Each suction device 18 therefore comprises a longitudinal path of the respective suction nose 21 The filter 15 to be cleaned by it is always disposed opposite it. It can clean the filter by simultaneous suction on a narrow area extending across the width of the filtering surface of filter 15, thus pneumatically cleaning the entire filtering surface of the portion, i.e. of filter 15, by making a single straight movement parallel to filter 15 in the longitudinal direction thereof.

When the filter device 10 is in operation, the interior 31 of beam 20 can be permanently connected to the negative pressure source 26, or only during a cleaning cycle, so as to produce a negative pressure in interior 31. A passage or opening 32 extends from interior 31 to each chamber 27, 27' of each suction nose 21. Each opening 32 is normally closed by an associated shut-off means, i.e. a pivotable flap 33 in the present case. The suction openings, however, are always open.

Each flap 33, independently of the other flaps, is pivotable from the shut to the open position and back again by a servomotor 40 or small air motor associated with it only.

Figure 3:
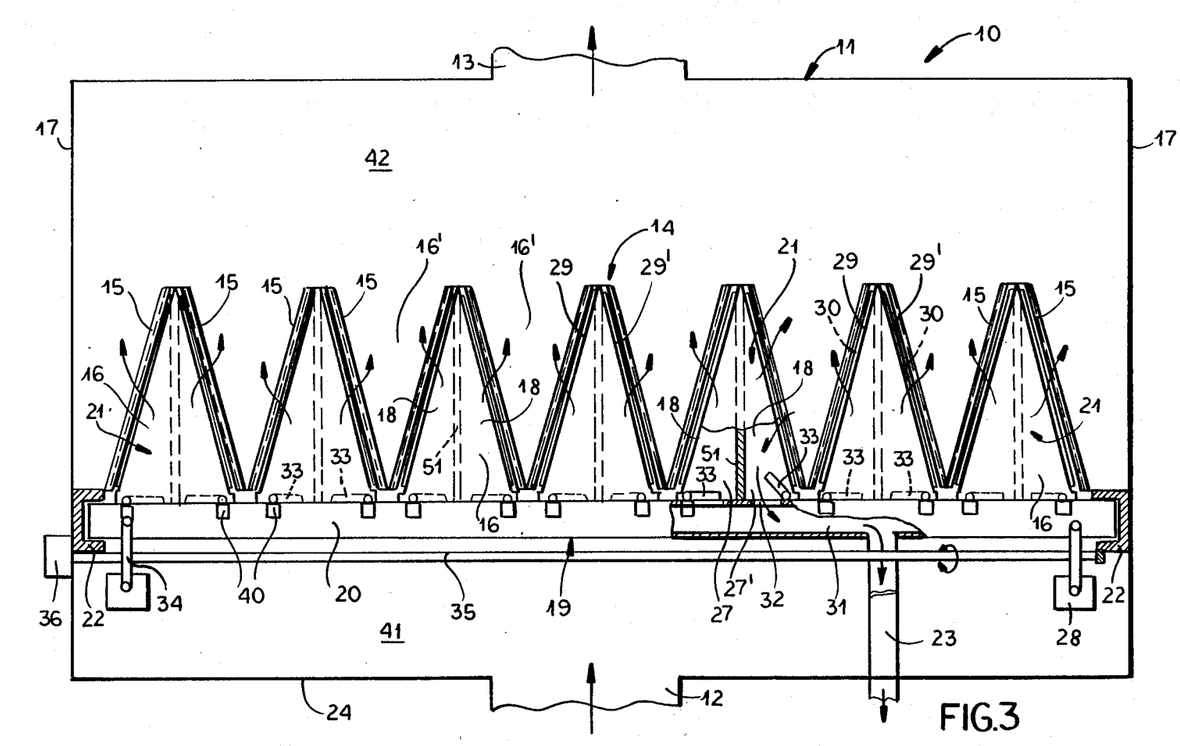
FIG. 3 is a section through the filter device in FIG. 1 along line III—III thereof.
Figure 4:
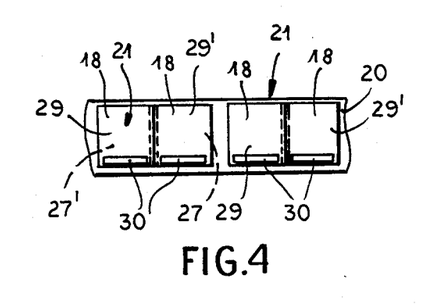
FIG. 4 is a horizontal partial front view of the suction drive of the filter device in FIGS. 1-3.

In FIG. 3 all the shut-off flaps 33 except for a single flap are shown in the shut position.

In this preferred embodiment, therefore, each suction nose 21 forms two suction devices 18 for cleaning the two filters 15 adjacent the nose 21, and the two suction devices 18 can be independently switched on and off selectively by flaps 33 so as to exert a suction effect.

Beam 20 is suspended on roller chains 37 guided on chain wheels 34. Wheels 34 are rotatably mounted near the roof of the outer casing 11. They are non-rotatably connected by a shaft 33 and can be driven by a reversible geared motor optionally in either direction for raising or lowering beam 20 and consequently noses 21.

Balancing weights 28 are suspended from the ends of chains 37 remote from beam 20 and balance the weight of the suction noses 21 permanently mounted on beam 20, so that motor 36 need relatively little power. The balancing weights 28 can also be disposed without difficulty outside the dirty space in the filter device, so that no impurities can settle on them.

The automatic programming device 31 is for actuating the servomotors 40 of flaps 33 and, if required, also for switching the motor 36.

Device 39 can be purely time-controlled or can also be automatically switched on for programming the course of a cleaning cycle only when pressure sensors disposed in the dirty chamber 41 and the clean chamber 42 of the filter device 10 sense a predetermined pressure difference which is large enough to require removing the accumulation of impurities from filter 15.

Advantageosly the programming device 39 can control each cleaning cycle e.g. as follows:

Beam 20 is driven by motor 36 through a number of successive strokes corresponding to the number of filters 15, the length of the strokes being such that at each stroke the suction openings 30 are guided along the vertical length of filter 15. Preferably, however, during each individual stroke (up or down) only one suction opening 30 is operative, i.e. is "switched on" whereas the other suction openings 31 are inoperative, i.e. "switched off". The advantage of this is that the negative-pressure source 26 only has to apply the low suction power needed for a single opening 30, and the separator 25 can also be made correspondingly smaller.

The respective suction nozzle 30 is switched on by opening the associated shut-off flaps 33, so that air is sucked into it by the negative-pressure source 26, so as to suck the filtering surface of the respective filter 1,, which is opposite the nozzle 30. The impurities, together with the air sucking them, are sucked through nozzle 30 into the respective chamber 27 or 27' of suction nose 21 and through the respective opening 32 of the respective chamber into the innterior of beam 20 and through the flexible pipe 23 and line 53 back to the fiber separator 25, where the impurities are concentrated and can be removed from the air.

Since each suction opening 30 exerts suction simultaneously across the full width of the facing filtering surface of the respective filter 15, the large rectangular filtering surface, which can be very large, e.g. 0.5 to 5 $cm^2$ or even larger or also smaller, can be completely cleaned by a single upward or downward stroke of beam 20, which extends vertically along the air-permeable region of filter 15.

After the stroke has been completed, the respective shut-off flap 33 is shut again by the associated servomotor 40 under the control of programmer 39, so that the respective suction device 18 is again switched off and another shut-off flap 33 can be automatically opened by the associated servomotor 40 under the control of programmer 39 and during the next stroke (downwards or upwards) of beam 20 another filter 15 is completely cleaned in similar manner by the associated suction device 18, in that air is sucked into the suction opening 30 by the negative-pressure source 26 and sucks the impurities which have accumulated in the respective filter 15 and conveys them to the fiber separator 25.

At the end of the stroke, the respective flap 33 is again shut and another shut-off flap 33 is opened for the next stroke, so that at each stroke of beam 20 the cleaning device 29 cleans the dirty side of a filter 15.

A cleaning cycle may advantageously comprise a number of strokes of beam 20 corresponding to the number of filters 15, and all the flaps 33 are opened and closed in succession in a predetermined sequence.

Advantageously, at each stroke only one shut-off flap 33 is opened and all the other flaps are correspondingly closed. Advantageously the sequence in which the flaps 33 are opened and closed can be made such that the two flaps 3 associated with a nose 21 are not opened immediately after one another but preferably at intervals approximately equal to half a cycle. This has the advantage, among others, that even when filter 15 is being cleaned, the air to be purified is distributed more uniformly over the collecting device 14. It also has the following important advantage.

The bottoms 45 of the dirty recesses 16 formed by the bottom of the casing 17 may acquire deposits of impurities and therefore the recess bottoms also need to be cleaned. This may advantageously be done pneumatically by the suction openings 30 of noses 21, if as in FIGS. 1 and 4 the openings are disposed at or near the bottom end region of the vertical longitudinal sides 29, 29' of noses 21. When beam 20 is at or near its lowest position, the air sucked by a switched-on suction opening 30 can also cause the textile impurities which have settled on the entire bottom 45 of the respective dirty recess 16 to be sucked into opening 30, thus pneumatically cleaning the bottom. It is therefore not necessary for both suction openings 30 of the respective nose 21 to be in operation. If the suction openings 30 are switched on at intervals which are staggered to the maximum extent, the bottom 45 of the respective dirty recess 16 is pneumatically cleaned separately twice in succession during a cycle, at intervals of approximately half a cycle, which is more advantageous than if cleaned substantially only once per cycle.

If filters 15 are numbered in the sequence in which they are disposed side by side in the collecting device 14, i.e. from 1 to 14 in the present case, it is particularly advantageous if the filters are cleaned in the following sequence: first the odd numbered filters (1, 3, 5 ...) in succession, followed by the even numbered filters (2, 4, 6 ...) or vice versa.

As mentioned, it is particularly advantageous to design the negative-pressure source 26 for the case where only one shut-off flap 33 is opened at any time. If required, however, two or more flaps 33 can be opened simultaneously or two or three flaps can be simultaneously opened on each occasion. This will considerably shorten the time for a cleaning cycle of filter 15. Usually, however, this is necessary, since the cleaning device 19 has a very short cycle even when only one flap 33 instead of a number of flaps are opened during a cleaning cycle.

Another advantage is that during each cleaning cycle the collecting device 14 is fully operative, and even the filter 15 being cleaned at a particular time is traversed by air for purification, i.e. acts as a filter, except for the narrow area being sucked at that time by the associated nozzle 30, which is completely negligible.

Since noses 21 are permanently at a distance from filters 15 and the suction air can pull the filtering surface towards a suction opening 30 only when switched on by opening the associated flap 33 (the filtering surfaces of filters 15 are normally somewhat flexible, i.e. not completely rigid, so that the stream of suction air flowing into opening 30 can move the filtering surface slightly towards the suction opening, thus further improving the cleaning effect of the suction nozzle), the noses 21 do not interfere with the filtering operation of the collecting device 14, so that the cleaning operation of the collecting device 14, so that the cleaning air always flows through the entire filtering surface of the collecting device 14, except for the narrow area which at a particular time is opposite a switched-on suction opening 30.

The filter device 10 is simple in construction and inexpensive. The drive of the cleaning device 19 is extremely simple, since beam 20 and noses 21 only have to make linear vertical stroke movements, which can also be relieved of weight. Device 19 is also very simple to control by the programming device 39, since only the servomotors 40 of flaps 33 and, if required, the driving motor 36 have to be controlled. The filter device 10 is also reliable and easy to maintain and the filters 15 can easily be replaced when required.

The pneumatic cleaning of filters 15 is extremely efficient, since the filtering surface of each filter 15 is simultaneously sucked across its entire width by the associated suction opening 30, so that the entire rectangular filtering surface of the respective filter 15 is quickly and thoroughly cleaned at once by a single upward or downward stroke of beam 20.

Also the consumption of suction air from the negative-pressure source 26 is low and the flow paths from nozzles 30 to the negative-pressure source 26 do not need complicated seals to avoid air leaks. There is no risk of a leak of air which will also have to be sucked by the negative-pressure source 26 and will not assist in cleaning the filter but will be wasted.

If the shut-off flaps 33 are disposed as shown, they provide a particularly simple seal when in the shut-off position, since the negative pressure in the interior 31 of beam 20 presses them against the sealing edges of the openings 32 in beam 20.

The vertical height of the beam and the noses 21 is much smaller than the vertical height (length) of filters 15.

Instead of a continuous suction opening or slot 30 per suction means 18, one or more rows of suction holes or suction nozzles may if required be disposed in the respective longitudinal side wall 29 or 29' of nose 21. This will have the same equivalent technical cleaning effect. However, a single suction slot 30 or a number of elongate suction slots in a row are particularly advantageous, since it or they can without difficulty suck more bulky textile impurities such as shreds or the like. A round suction hole, on the other hand, may become clogged by bulky impurities and thus be incapable of sucking.

At least one inspection flap, preferably transparent, can also be disposed on beam 20 to show when the device is opened.

Another advantage is that the collecting device 14 can be designed differently from the illustrated accordion arrangement of filters 15, because the shape of the suction noses 21 can be adapted to any desired shape and also to any two-dimensional curvature of filters.

For example the filters can also be arcuate in cross-section at right angles to the direction of motion of the suction noses. More particularly, the collecting device 14 can advantageously be corrugated in cross-section at right angles to the stroke of the suction means used for cleaning it, the corrugations preferably being approximately accordion-like or made up of approximately sinusoidal or trapezoidal or rectangular or other wave shapes to which the suction noses extending into the resulting dirty recesses can be correspondingly adapted, or at least one differently-designed suction means can be movable from recess to recess.

Alternatively, the cleaning cycles need not be separate at intervals but one cycle can follow another during operation of the filter device, or beam 20 can be continuously moved slowly upwards and downwards and one shut-off flap can be opened alternatively per stroke, or each stroke of beam 20 can be followed by a variable inoperative time before the next stroke, etc.

The energy needed for pneumatic cleaning is very small.

Figure 5:
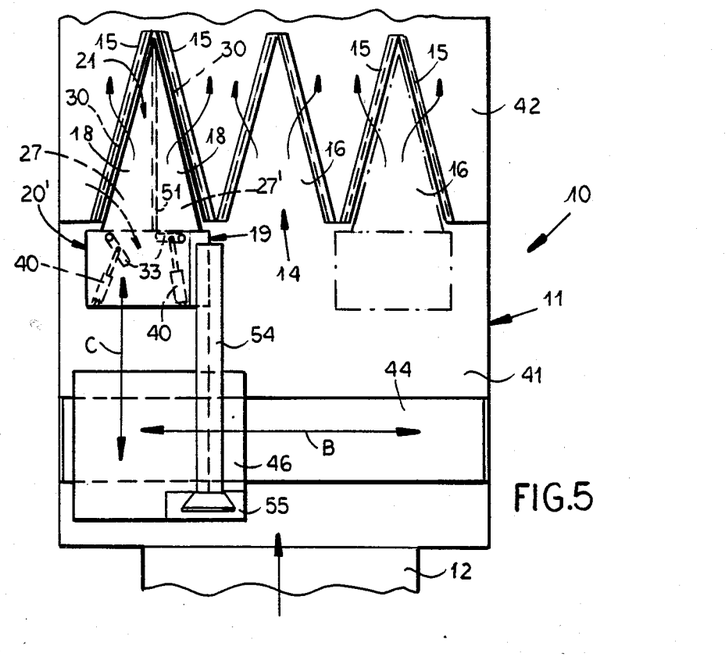
FIGS. 5 and 6 are partial sections through filter devices according to other embodiments of the invention.

FIG. 5 shows an embodiment of the filter device 10 comprising a cuboid casing 11 containing a collecting device 14 similar to that in FIGS. 1-4, but in the present embodiment it comprises only a total of six portions each formed by a flat filter 15 and disposed in a total of three "V"s in plan view, resulting in a total of three dirty recesses 16 in this case. In contrast to the embodiment in FIGS. 1-4, filter 15 is cleaned by a cleaning device 19 comprising a single suction nozzle 21 disposed on a hollow bearer 20'. Nose 21 can have the same design as the noses 21 in FIGS. 1-4, and more particularly can comprise a partition 51 dividing it into two suction means 18 each having a chamber 27, 27', the two outlet openings leading into the interior of bearer 20' being openable and closable independently of one another by shut-off flaps 33 actuated by servomotors 40.

Figure 2:
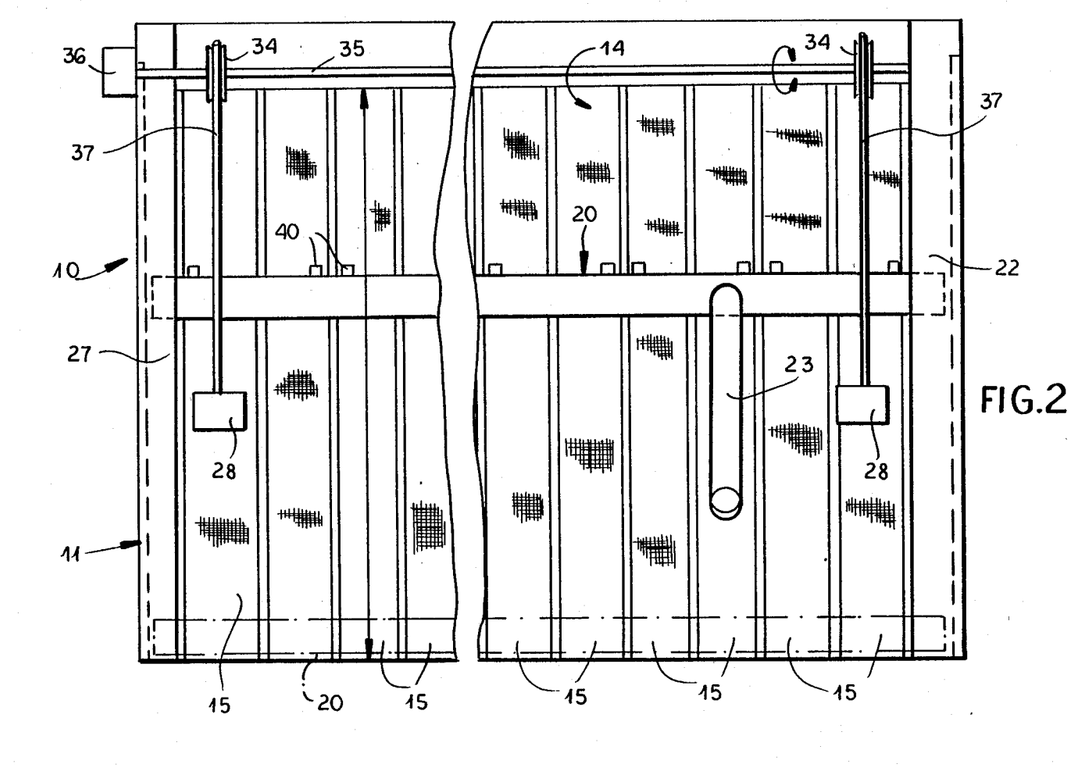
FIG. 2 is a section through the filter device in FIG. 1 along line II—II of FIG. 1.

As in the embodiment in FIGS. 1-3, the interior of bearer 20' is connected by a flexible tube (not shown) and additional air-conveying means and a fiber separator to a negative-pressure source which can e.g. be continuously switched on during operation of the filter device 10.

The carrier or bearer 20' (i.e. a beam) and the suction nozzle 21 fixed thereto can be driven as required into any of three dirty recesses 16 by a drive and guide device which can move in three dimensions. In each retracted position, bearer 20' can be driven in strokes along the respective filters 15, during which the filters 15 can be pneumatically cleaned over their entire height and width by the suction means 18. As before, the heights of bearer 20' and nose 21 measured parallel to the stroke are small compared with the height or length of filter 15 measured in the same direction, so that nose 21 does not interfere with the operation of the facing filter 15 even when the filter is being cleaned.

The filter device 10 operates as follows. A slide 46 is disposed on a straight stationary guide 44 inside the filter device 10 and can be moved horizontally in reciprocation in the direction of the double-headed arrow B. A guide arm 54 is guided in a straight line on slide 46 in a vertical guide 55 secured thereto and comprising a guide channel having a dovetail cross-section, the bearer 20' being horizontally guided on the straight arm 54 in the direction of the double-headed arrow C.

The vertical stroke movements of bearer 20' at right angles to the plane of the drawing for automatically cleaning the filter 15, and consequently the movements of the individual suction noses 21, are brought about by vertically moving the horizontal guide arm 54 in the vertical guide 55, using a servomotor (not shown).

In order to move nose 21 from one dirty recess 16 to another dirty recess 16 for cleaning one or both the associated filters 15, nozzle 21 is moved out of the respective dirty recess 16 by the motor horizontally driving the bearer 20' parallel to the direction of the double arrow C, after which the slide or carriage 46 is moved by a motor parallel to the direction of arrow B to the next dirty recess, so that nose 21 is now opposite the second dirty recess 16 and is then driven into it by horizontally moving the bearer 20' and can then clean one or both the respective filters 15 during at least one or two vertical strokes of filter 20' by opening the respective flap or flaps 33. Nose 21 can also be automatically driven into the third dirty recess 16 for cleaning the associated filters 15.

As before, the cleaning device 19 can be controlled by a programming device and/or a timing device or the like. In this embodiment also, the collecting device 14, which is immovably disposed in the outer casing 11, can be pneumatically operated quickly, efficiently and automatically in desired manner using little suction air, either continuously or periodically and automatically via the cleaning device 19.

As before, the suction openings 30 of noses 21 can without difficulty be designed so that they can also suck relatively bulky textile pieces such as fabric residues or the like without risk of clogging.

Figure 6:
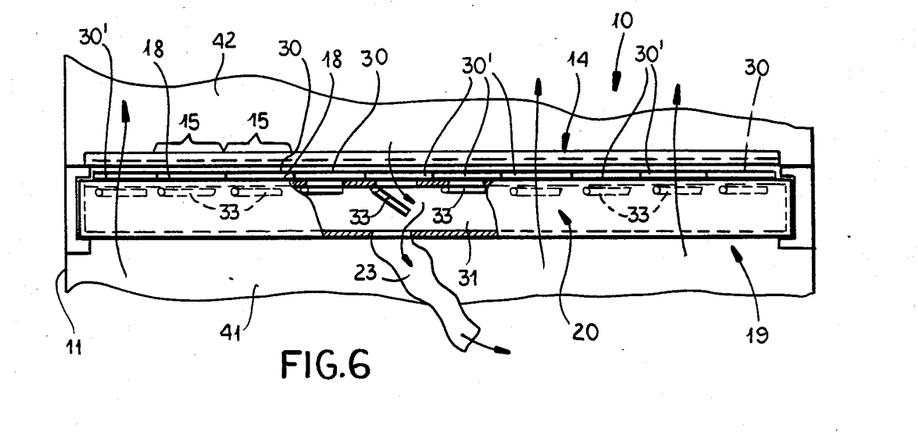

FIG. 6 shows part of a filter device 10 in section, the main difference from the previous embodiments being that the collecting deice 14, which is fixed in the outer casing 11, is approximately flat. It can be vertical or horizontal or at an angle to the horizontal and comprise one filter or a number of filters disposed side by side or in other ways. It is associated with a pneumatic cleaning device 19.

Device 19 comprises a supporting beam 20 at a small distance from the collecting device 14 and constructed in similar manner to that in FIGS. 1-4 and drivable only in linear strokes. However, no triangular suction noses are disposed on the beam; instead, at its side facing the filter it has slotted suction openings 30 on suction nozzles 30' disposed side by side in a straight line. Each opening 30 is for sucking a portion 15, exclusively associated with it only, of the air-permeable filtering surface of the collecting device 14, the portion extending up the height of the surface. Each suction opening 30 can be closed by a shut-off means exclusively associated with it only (i.e. a shut-off flap 33 as before) from the hollow interior 31 of beam 20, which can be connected to a negative-pressure source actuated by a separate servomotor (not shown) exclusively associated with it only. The hollow interior 31 of beam 20 can be connected by a flexible suction line 23, as in the embodiment of FIG. I, to a further line and to a separator and to a negative-pressure source connected in front of or behind the separator (none of which are shown).

In the present case each nozzle 30' formed with a suction slot 30 constitutes a suction means 18 closable by an associated shut-off flap. Slots 30 extend in a row parallel to the longitudinal direction of beam 20 and are sufficiently close to one another for completely cleaning the filter or filters of the collecting device 14. Each suction opening 30 cleans the facing portion 15 of the filtering surface of the collecting device when the negative-pressure source is switched on and the flap 33 associated with the suction opening 30 is opened and beam 2 makes at least one stroke extending up the height of portion 15. Portions 15 can be immediately adjacent one another or can even overlap or be separated by airtight webs or the like. In order to reduce the volume of suction air for pneumatically cleaning the collecting device 14, flaps 33 are not opened simultaneously. Instead, the negative-pressure source is preferably made so weak that preferably only one flap 33 or at most two or a few of the total available flaps 33 have to be opened at one time, for effective cleaning. As before, the flaps 33 can be opened or closed in cycles by a programming device (not shown) in a given sequence for a cleaning cycle. The cleaning cycle can follow without intervals or with intervals, e.g. time-controlled or in dependence on the pressure difference between the dirty chamber 41 and the clean chamber 42 of the filter device 10. Other possibilities are also conceivable.

If only one flap 33 at a time is opened during a stroke of beam 20, a cleaning cycle of the filtering surface of device !4 will require a number of upward and downward strokes of beam 20 corresponding to the number of flaps 33. As before, if the flaps 33 are numbered in accordance with their position in the row, the odd flaps 33 can be opened first in succession, followed by the even flaps, and can be closed in the same order, or the sequence of opening and closing the flaps 33 can be differently programmed, e.g. by opening and closing them in succession as they come in the row.

Device 10 is likewise energy-saving, reliable and extremely efficient. Using little suction air, it can pneumatically clean the filter 15 quickly and extremely efficiently. Device 10 is also very simple in construction, because it requires only a single flat collecting device.

The collecting device 14 can be disposed vertically, which is usually particularly advantageous. However, other arrangements are possible, e.g. horizontal or an angle to the horizontal if desired for any reasons.

In the embodiment of FIGS. 1 to 4, all the suction noses 21 are disposed on the same supporting beam 20. Alternatively, in many cases a single suction means 18 can be associated with each filter 15 but each suction nose 21 can be fixed to a single hollow bearer 20' which holds it only, as in FIG. 5, but can be driven in linear strokes like beam 20, independently of the other bearers. In that case each suction nozzle 21 will be individually movable independently of the other noses 21, so that on each occasion, only the nose 21 associated with the respective two filters 15 needs to be moved in order to clean them whereas the other noses 21 remain inoperative during this time.

The reciprocating motion of the individual noses 21 can be brought about by a single stroke drive or the like, e.g. by threaded spindles meshing with threaded nuts fixed on the nose 21 or bearer and drivable in rotation in opposite directions, and the threaded spindles of noses 21 can be driven independently of one another by motors. Alternatively a single drive can be provided for all the independently movable suction noses, which can be optionally coupled automatically thereto so as to move in reciprocation, etc. In that case two suction mean will be disposed on each bearer.

If required, only one suction means or more than two suction means can be disposed on the bearers, e.g. for each two suction noses 21.

Alternatively, the filter device in FIG. 5 can be modified so that it comprises only a single V arrangement of two filters 15 and accordingly the single suction nose 21 is used for cleaning the two filters 15 of the collecting device and the bearer 20' is moved only in linear reciprocation and the nose always remains inside the single dirty recess into which it projects. Advantageously as before, nose 21 is divided into two separate chambers 27, 27' in order to clean the two filters 15 independently of one another, so as to keep the suction power of the negative-pressure source at a minimum.

Advantageously also, if required, the suction nose 21 (FIGS. 1-5) can comprise a single suction device, if the partition 51 is omitted and the nose is associated with only an overflow opening 32 with an associated shut-off flap 33 for switching it on and off, although in that case the volume of the suction stream would have to be correspondingly greater than when the suction nose is divided into two suction devices 18. In that case the filtering area or areas of each V-shaped area of the collecting device will form a single filtering portion extending approximately up the height of the collecting device and, in the embodiment in FIGS. 1-4, in this variant of the suction noses 21 the collecting device 14 would have only seven portions, each formed by two filters 15, and each portion being associated with a suction nozzle constituting a single suction device.

We claim:

1. A filter apparatus for removing fiber fragments from air drawn from a region of a textile machine, comprising:

a filter housing;

a fixed filter collector in said housing formed with a plurality of active filter portions permeable to air and having generally extended surfaces upon which textile fragments collect, each surface having a recess defined by two side walls inclined to one another;

an inlet on said housing through which air entraining filter fragments is drawn into said housing and an outlet on said housing through which air freed from said fragments is discharged from said housing after passing through said fixed filter collector and depositing said filter fragments on said surfaces; and pneumatic cleaning means in said housing for separately cleaning said surfaces of said active filter portions, said pneumatic cleaning means including:

a plurality of suction devices juxtaposed with said surfaces of said portions on a side thereof upon which said fiber fragments collect, said suction devices with adjoining walls forming a suction nose projecting into said recess, said suction nose capable of cleaning across a full width and movable vertically along a full length of said recess, guide means in said housing forming a straight linear guide path extending generally parallel to a longitudinal dimension of said one of said portions, means for displacing said suction device along said straight guide path, said suction device extending along said one of said portions in a direction transverse to the direction of displacement of said suction device along said guide path, means for applying suction to said device so that fiber fragments accumulated on said surface of said one of said portions are evacuated therefrom through said suction device and said one of said portions is cleaned in a single movement of said suction device in a straight line, and means for selectively applying suction and automatically operating said suction devices individually in succession and in a predetermined sequence during a cleaning cycle.

2. The filter apparatus defined in claim 1 wherein said pneumatic cleaning means comprises a common hollow movable carrier bearing all of said suction devices, forming said means for applying suction to said suction devices, and provided with means for selectively communicating suction to said devices.

3. The filter apparatus defined in claim 1 wherein each of said portions and the respective filter surface is linearly elongated, and said pneumatic cleaning means comprises a plurality of movable carriers each bearing at least one of said suction devices and independently movable only in linear reciprocation along longitudinal dimensions of respective ones of said portions for pneumatically cleaning the respective surfaces.

4. The filter apparatus defined in claim 1 wherein said portions and the respective said surfaces are paired and each of said surfaces is cleaned with a respective one of said suction devices, the suction devices of each pair of said surfaces being joined in a common structural unit.

5. The filter apparatus defined in claim 1, further comprising means for shifting said suction device into juxtaposition with at least one other of said surfaces following the cleaning of a surface with which said suction device was previously juxtaposed.

6. The filter apparatus defined in claim 1 wherein only two of said portions form each said recess and the two portions forming each recess are inclined to one another to define a V-shape cross section.

7. The filter apparatus defined in claim 1 wherein only two of said portions form each said recess and the two portions forming each recess are inclined to one another to define a generally trapezoidal cross section.

8. The filter apparatus defined in claim 1 wherein said collecting device has an air-permeable region formed by said surfaces which is generally accordion shaped.

9. The filter apparatus defined in claim 1 wherein a plurality of said suction devices are provided, each juxtaposed with at least one of said surfaces, said filter apparatus further comprising means for switching said suction devices on and off selectively and independently of one another.

10. The filter apparatus defined in claim 1 wherein said suction device has a single slot-shaped suction opening.

11. The filter apparatus defined in claim 1, further comprising means on said suction device including at least one suction opening formed in a side wall or proximal to an end thereof, for sucking away fragments which can have accumulated on a base of the suction device.

12. The filter apparatus defined in claim 1 wherein said pneumatic cleaning means comprises a plurality of hollow movable bearers each carrying a respective suction nose, said hollow bearers each independently movable of the other bearers thereby allowing each suction nose to be individually movable independently of the other noses, and that when a suction nose applies suction to said filter portion surfaces then the other noses remain inoperative during such time.

13. The filter apparatus defined in claim 1 wherein said pneumatic cleaning means comprises a single suction nose, said suction nose being sequentially movable into a plurality of said recesses such that said filter portion surfaces of said recesses are sequentially cleaned one after another.

14. The filter apparatus defined in claim 13 wherein said single suction nose is horizontally movable out of one recess and thereafter horizontally movable into a subsequent recess.

15. The filter apparatus defined in claim 13 wherein said single suction nose is vertically movable upwards out of said one recess and subsequently horizontally movable into another recess and thereafter vertically movable within said another recess.

16. In a method of operating a filter apparatus which comprises:

a filter housing;

a fixed filter collector in said housing formed with a plurality of active filter portions permeable to air and having generally extended surfaces upon which textile fragments collect, each surface having a recess defined by two side walls inclined to one another;

an inlet on said housing through which air entraining filter fragments is drawn into said housing and an outlet on said housing through which air freed from said fragments is discharged from said housing after passing through said fixed filter collector and depositing said filter fragments on said surfaces; and pneumatic cleaning means in said housing for separately cleaning said surfaces of said active filter portions, said pneumatic cleaning means including:

a plurality of suction devices juxtaposed with said surfaces of said portions on a side thereof upon which said fiber fragments collect, said suction devices with adjoining walls forming a suction nose projecting into said recess, said suction nose capable of cleaning across a full width and movable vertically along a full length of said recess.

guide means in said housing forming a straight linear guide path extending generally parallel to a longitudinal dimension of said one of said portions, means for displacing said suction device along said straight guide path, said suction device extending along said one of said portions in a direction transverse to the direction of displacement of said suction device along said guide path, means for applying suction to said device so that fiber fragments accumulated on said surface of said one of said portions are evacuated therefrom through said suction device and said one of said portions is cleaned in a single movement of said suction device in a straight line, and means for selectively applying suction and automatically operating said suction devices individually in succession and in a predetermined sequence during a cleaning cycle, the improvement which comprises:

automatically operating said suction device to suck fiber fragments from and clean said surfaces individually, in succession and in a predetermined sequence during a cleaning cycle.

17. The method defined in claim 16 wherein said surfaces are cleaned in the sequence that they are disposed in the cleaning device but skipping a surface between each two surfaces in each sequence.

18. The method defined in claim 16 wherein each cleaning cycle interval is followed by an interval between successive cleaning cycles and at least one of said intervals is time programmed.

19. The method defined in claim 16, further comprising the steps of:

sensing a pressure differential across said collecting device between air to be cleaned and cleaned air;

comparing the sensed pressure differential with a predetermined adjustable set-point pressure difference; and initiating said cleaning cycle when said pressure differential reaches said pressure difference.

20. The method defined in claim 16 wherein each of said portions of the collecting device is cleaned during a single stroke of a respective said suction device.

* * * * *